(12) United States Patent
Jo (10) Patent No.: US 12,046,739 B2
(45) Date of Patent: Jul. 23, 2024

(54) ELECTRODE NOTCHING DEVICE FOR SECONDARY BATTERY, ELECTRODE FOR SECONDARY BATTERY MANUFACTURED THERETHROUGH, AND SECONDARY BATTERY

(71) Applicant: LG ENERGY SOLUTION, LTD., Seoul (KR)

(72) Inventor: Mi Ru Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 461 days.

(21) Appl. No.: 17/605,895

(22) PCT Filed: Apr. 24, 2020

(86) PCT No.: PCT/KR2020/005465
§ 371 (c)(1),
(2) Date: Oct. 22, 2021

(87) PCT Pub. No.: WO2020/218891
PCT Pub. Date: Oct. 29, 2020

(65) Prior Publication Data
US 2022/0123272 A1 Apr. 21, 2022

(30) Foreign Application Priority Data
Apr. 25, 2019 (KR) .................. 10-2019-0048650

(51) Int. Cl.
*H01M 4/04* (2006.01)
*B26F 1/12* (2006.01)
*H01M 50/533* (2021.01)

(52) U.S. Cl.
CPC ............ *H01M 4/04* (2013.01); *B26F 1/12* (2013.01); *H01M 50/533* (2021.01)

(58) Field of Classification Search
CPC ............ Y10T 83/4812; Y10T 83/0259; Y10T 83/0529; Y10T 83/485; Y10T 83/5669;
(Continued)

(56) References Cited

U.S. PATENT DOCUMENTS 3,827,321 A * 8/1974 Bley .................. B21D 28/36
83/345
4,125,182 A * 11/1978 Karlowicz ............... B26D 7/24
192/127
(Continued)

FOREIGN PATENT DOCUMENTS

CN 103238237 A 8/2013
CN 208986087 U 6/2019
(Continued)

OTHER PUBLICATIONS

International Search Report for PCT/KR2020/005465 mailed on Aug. 11, 2020.
(Continued)

*Primary Examiner* — Phong H Nguyen
(74) *Attorney, Agent, or Firm* — Birch, Stewart, Kolasch & Birch, LLP (57) ABSTRACT

Discussed is an electrode notching device for a secondary battery, the electrode for a secondary battery, which is manufactured therethrough, and a secondary battery. The electrode notching device for the secondary battery, which notches a non-coating portion of an electrode sheet to provide an electrode tab, includes: a pair of notching molds configured to press and notch the electrode sheet; and a movement prevention roller part provided on pressing surfaces of the pair of notching molds to prevent the electrode sheet from moving when the electrode sheet is notched.

15 Claims, 6 Drawing Sheets

(58) Field of Classification Search
CPC ............ Y10T 83/5742; Y10T 83/5751; Y10T 83/7487; Y10T 83/7493; Y10T 83/7513; H01M 4/04; H01M 50/533; B26F 1/12; B26F 1/14; B26F 1/38
See application file for complete search history.

(56) References Cited

U.S. PATENT DOCUMENTS

| | | | |
|---|---|---|---|
| 5,062,331 | A | 11/1991 | Michal et al. |
| 2013/0014625 | A1 | 1/2013 | Yotsumoto et al. |
| 2013/0252072 | A1 | 9/2013 | Min et al. |
| 2020/0058931 | A1 | 2/2020 | Yoon et al. |
| 2020/0206965 | A1* | 7/2020 | Kwak ................. H01M 50/531 |

FOREIGN PATENT DOCUMENTS

| | | |
|---|---|---|
| JP | 2013-30360 A | 2/2013 |
| KR | 10-0908573 B1 | 7/2009 |
| KR | 10-2011-0092463 A | 8/2011 |
| KR | 10-2013-0073329 A | 7/2013 |
| KR | 10-1321125 B1 | 10/2013 |
| KR | 10-1332935 B1 | 12/2013 |
| KR | 10-2014-0009015 A | 1/2014 |
| KR | 10-2014-0015647 A | 2/2014 |
| KR | 10-1479724 B1 | 1/2015 |
| KR | 10-2015-0040480 A | 4/2015 |
| KR | 10-2016-0076139 A | 6/2016 |
| KR | 10-2017-0048757 A | 5/2017 |
| KR | 10-2018-0032043 A | 3/2018 |
| KR | 10-1857396 B1 | 5/2018 |
| KR | 10-1926451 B1 | 12/2018 |
| KR | 10-1930071 B1 | 12/2018 |
| KR | 10-2019-0006210 A | 1/2019 |
| WO | WO 91/01858 A1 | 2/1991 |

OTHER PUBLICATIONS

Extended European Search Report for European Application No. 20793993.5, dated Apr. 19, 2022.

* cited by examiner

ELECTRODE NOTCHING DEVICE FOR SECONDARY BATTERY, ELECTRODE FOR SECONDARY BATTERY MANUFACTURED THERETHROUGH, AND SECONDARY BATTERY

CROSS-REFERENCE TO RELATED APPLICATION

The present application claims the benefit of the priority of Korean Patent Application No. 10-2019-0048650, filed on Apr. 25, 2019, which is hereby incorporated by reference in its entirety.

TECHNICAL FIELD

The present invention relates to an electrode notching device for a secondary battery, the electrode for a secondary battery, which is manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

Also, the electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the related art, an end of an electrode sheet is notched to form an electrode tab on the electrode applied to the electrode assembly.

However, since local deformation occurs due to elongation of an electrode collector, which occurs in an electrode production process, there are problems in that it is difficult to maintain tension of the electrode, and a stepped portion of the electrode largely occurs when the electrode is notched. That is, since portions of the electrode, which are notched whenever the electrode is notched, are not uniform, there is a problem that stepped portions, at which the electrode have different widths at the portions notched whenever the electrode is notched, occur. As a result, when a positive electrode and a negative electrode are notched and stacked to manufacture an electrode assembly, there has been a problem that an overhang defect occurs between the positive electrode and the negative electrode (overhang means a state in which an entire surface of the positive electrode does not face the negative electrode, and thus, a surface through which the positive electrode is exposed occurs to cause lithium precipitation and capacity degradation). Here, when the electrode is notched, movement of the electrode largely increases due to upward/downward movement of a mold to significantly cause notching defects of the electrode.

[Prior Art Document] (Patent Document) Korean Patent Publication No. 10-2014-0015647

DISCLOSURE OF THE INVENTION

Technical Problem

One aspect of the present invention is to provide an electrode notching device for a secondary battery, which is capable of minimizing movement of an electrode when an electrode tab is formed on the electrode, an electrode for a secondary battery, which is manufactured therethrough, and a secondary battery.

Technical Solution

An electrode notching device for a secondary battery, which notches a non-coating portion of an electrode sheet to provide an electrode tab, according to an embodiment of the present invention may include: a pair of notching molds configured to press and notch both surfaces of the electrode sheet; and a movement prevention roller part provided on pressing surfaces of the pair of notching molds to prevent the electrode sheet from moving when the electrode sheet is notched.

Also, an electrode for a secondary battery according to an embodiment of the present invention may be manufactured through the electrode notching device for the secondary battery.

Furthermore, a secondary battery according to an embodiment of the present invention may be manufactured through the electrode notching device for the secondary battery according to an embodiment of the present invention.

Advantageous Effects

According to the present invention, when the electrode tab is formed on the electrode, the movement prevention roller part may be mounted on the notching mold to prevent the electrode from moving. Therefore, when the positive electrode and the negative electrode are stacked to manufacture the electrode assembly, the uniform notching may be enabled to minimize the overhang between the positive electrode and the negative electrode.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts, which may unnecessarily obscure disclosure of the present invention, will be omitted.

Figure 1:
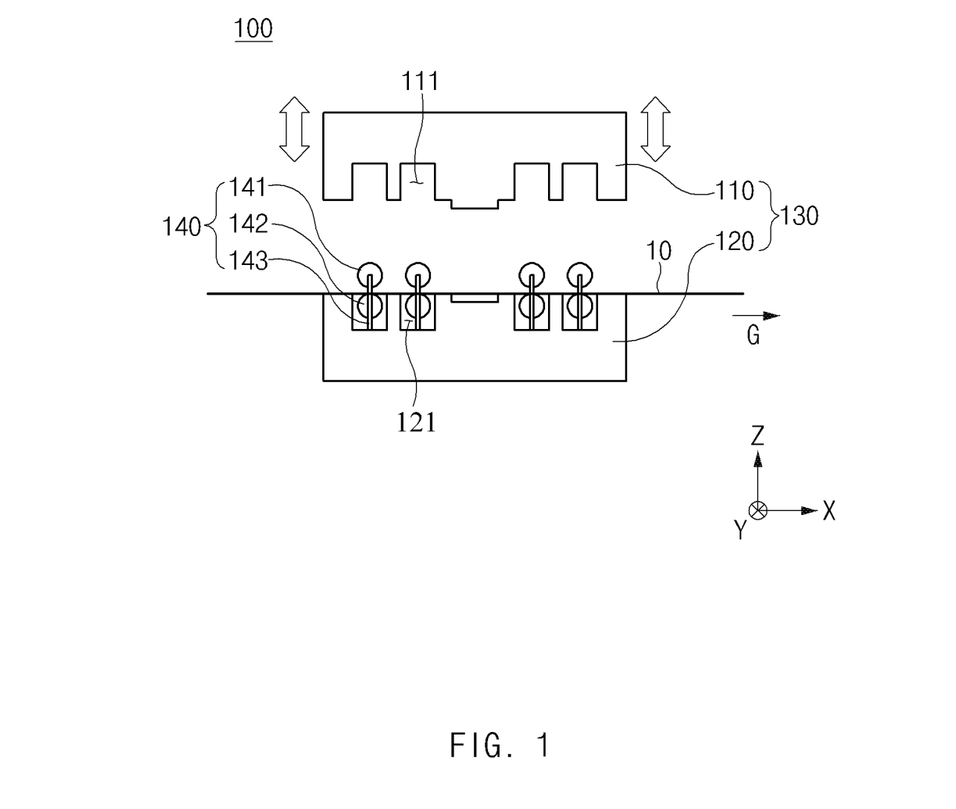
FIG. 1 is a conceptual front view of an electrode notching device for a secondary battery according to an embodiment of the present invention.
Figure 2:
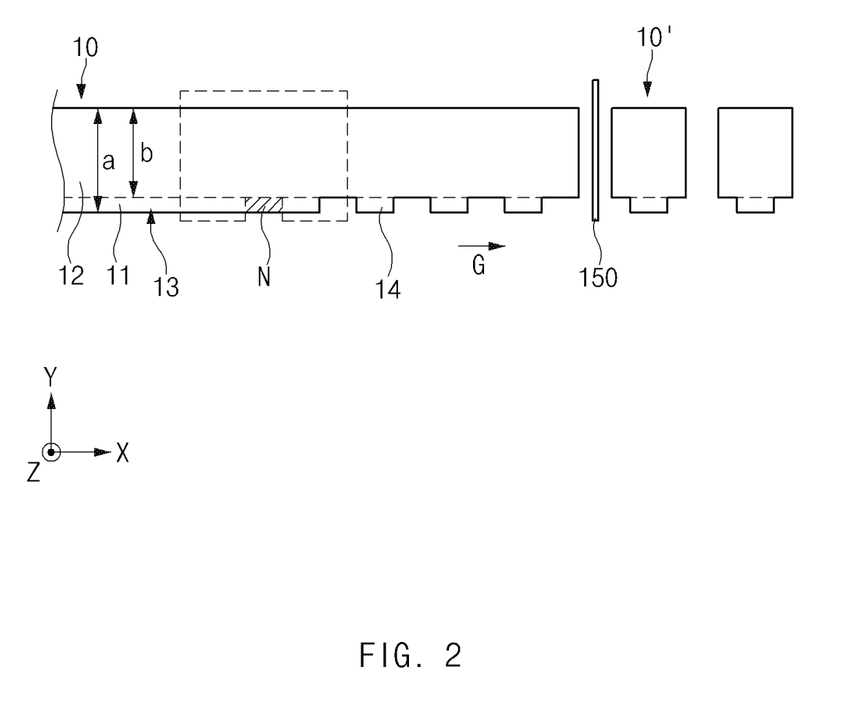
FIG. 2 is a plan view illustrating an example of an electrode sheet that is notched through the electrode notching device for the secondary battery according to an embodiment of the present invention.

FIG. 1 is a conceptual front view of an electrode notching device for a secondary battery according to an embodiment of the present invention, and FIG. 2 is a plan view illustrating an example of an electrode sheet that is notched through the electrode notching device for the secondary battery according to an embodiment of the present invention.

Referring to FIGS. 1 and 2, an electrode notching device 100 for a secondary battery according to an embodiment of the present invention comprises a pair of notching molds 130 that press and notch both or opposite surface of the electrode sheet 10 and a movement prevention roller part (or a movement prevention roller) 140 preventing (or reducing) the electrode sheet 10 from moving (or not aligning correctly) when the electrode sheet 10 is notched.

In more detail, the electrode notching device 100 for the secondary battery according to an embodiment of the present invention is a notching device that notches a non-coating portion 13 of the electrode sheet 10 to provide an electrode tab 14.

The electrode sheet 10 applied to the electrode notching device 100 for the secondary battery according to an embodiment of the present invention may be alternately stacked with separators so as to be manufactured as an electrode assembly. Here, the electrode assembly may be a chargeable and dischargeable power generation element and be accommodated in a battery case so as to be manufactured as a secondary battery.

The electrode sheet 10 may be cut into a predetermined size by a cutter 150 and manufactured as electrodes 10'. Here, the electrodes 10' may be constituted by a positive electrode and a negative electrode. Here, the electrode assembly may be manufactured in a shape in which a positive electrode, a separator, and a negative electrode are alternately stacked to be bonded to each other.

Also, the electrode sheet 10 may be provided in a shape in which an electrode active material 12 is applied to an electrode collector 11. Here, the electrode sheet 10 may be provided on an area of the non-coating portion 13 that is not coated with the electrode active material 12.

Figure 3:
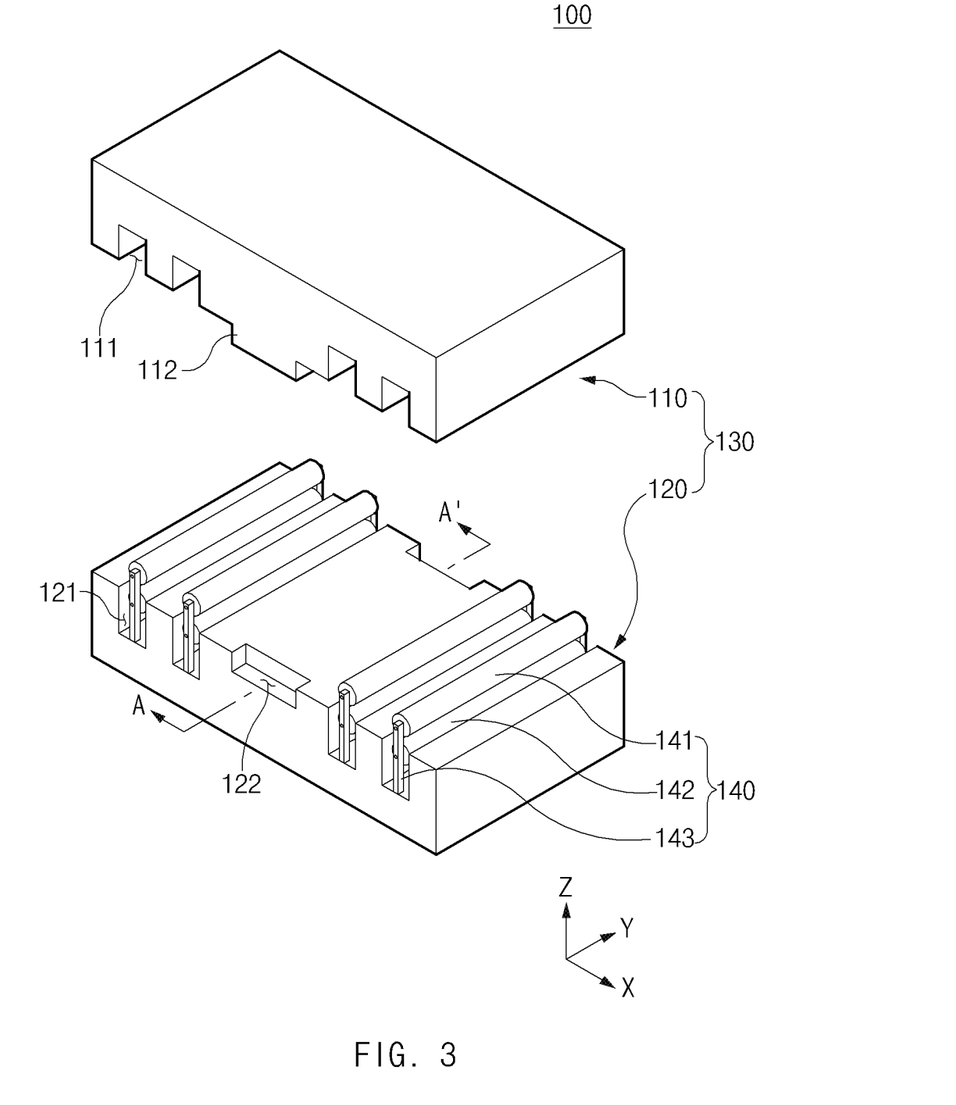
FIG. 3 is a perspective view of the electrode notching device for the secondary battery according to an embodiment of the present invention.
Figure 4:
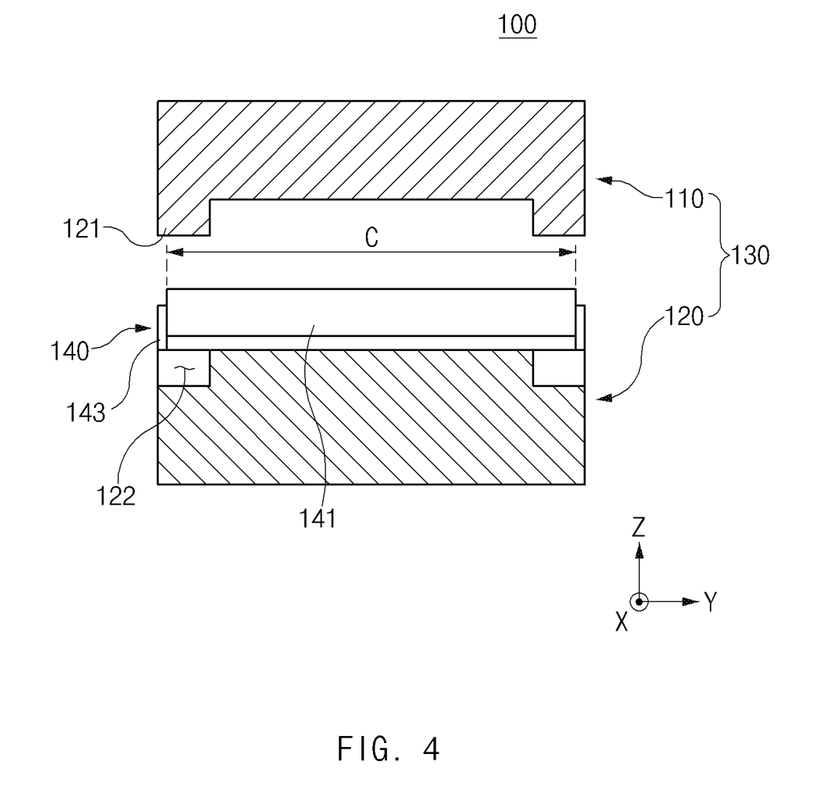
FIG. 4 is a cross-sectional view taken along line A-A' of FIG. 3.

FIG. 3 is a perspective view of the electrode notching device for the secondary battery according to an embodiment of the present invention, and FIG. 4 is a cross-sectional view taken along line A-A' of FIG. 3.

Referring to FIGS. 2 to 4, the pair of notching molds 130 may press and notch both the surfaces of the electrode sheet 10.

Also, the pair of notching molds 130 may comprise an upper mold 110 and a lower mold 120, which are provided to face each other.

An upper roller accommodation groove 111 may be defined in the upper mold 110, and a lower roller accommodation groove 121 may be defined in the lower mold 120 to accommodate the movement prevention roller part 140.

Here, the upper roller accommodation groove 111 and the lower roller accommodation groove 121 may be defined in opposite sides of the upper mold 110 and the lower mold 120.

Here, the upper roller accommodation groove 111 and the lower roller accommodation groove 121 may be defined in the upper mold 110 and the lower mold 120 to correspond to each other in directions facing each other.

Also, a lower roller 142 may be accommodated in the lower roller accommodation groove 121 of the lower mold 120, and an upper roller 141 may be accommodated in the upper roller accommodation groove 111 of the upper mold 110 when the upper mold 110 moves toward the lower mold 120.

Also, the upper mold 110 and the lower mold 120 may move in a vertical direction that is perpendicular to a traveling direction G of the electrode sheet 10. Here, for example, the lower mold 120 may be fixed, and the upper mold 110 may move vertically to press the electrode sheet 10, thereby providing the electrode tab 14. Here, for example, the electrode sheet 10 may travels along a top surface of the lower mold 120, and the movement prevention roller part 140 may be mounted in the lower roller accommodation groove 121 of the lower mold 120.

A notching protrusion 112 protruding toward the lower mold 120 may be disposed on the upper mold 110, and a notching groove 122 may be defined in the lower mold 120 to correspond to the notching protrusion 112. Thus, the electrode sheet 10 may be notched by the notching protrusion 112 and the notching groove 122 to provide the electrode tab 14. That is, the upper mold 110 may move toward the lower mold 120, the notching protrusion 112 of the upper mold 110 may be inserted into the notching groove 122 of the lower mold 120 to press and notch a notching portion N of the electrode sheet 10 disposed between the upper mold 110 and the lower mold 120. Here, the notching protrusion 112 may be provided to protrude in, for example, a square pillar shape.

Figure 5:
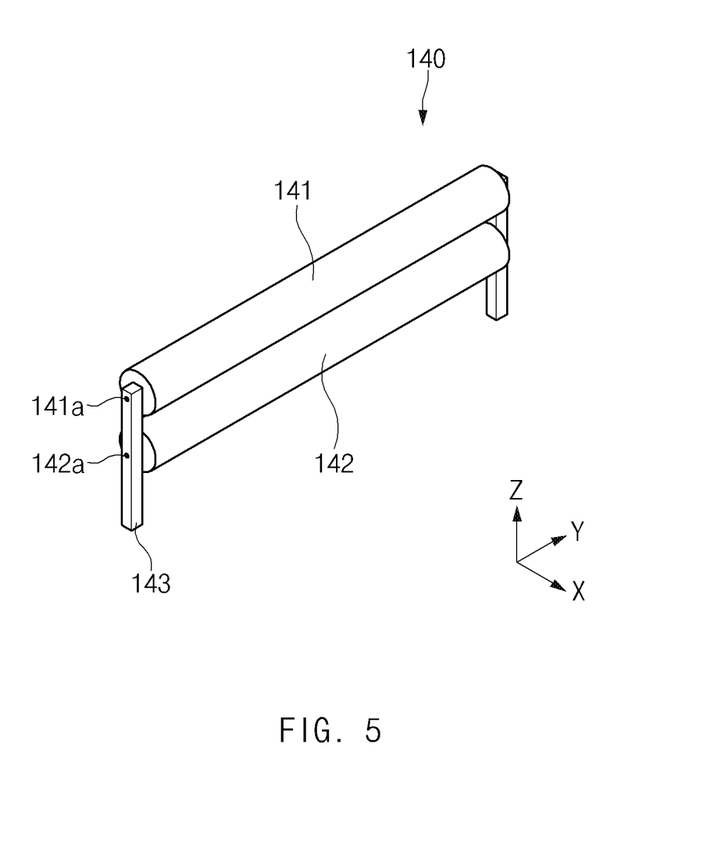
FIG. 5 is a perspective view of a movement prevention roller part in the electrode notching device for the secondary battery according to an embodiment of the present invention.

FIG. 5 is a perspective view of the movement prevention roller part in the electrode notching device for the secondary battery according to an embodiment of the present invention.

Referring to FIGS. 1, 3 and 5, the movement prevention roller part 140 may be provided on pressing surfaces of the pair of notching molds 130 to prevent the electrode sheet 10 from moving when the electrode sheet 10 is notched.

Also, the movement prevention roller part 140 may comprise a pair of rollers 141 and 142. The electrode sheet 10 may pass between the pair of rollers 141 and 142 and be supported by the pair of rollers 141 and 142. Here, the movement prevention roller part 140 may further comprise a support frame 143 supporting the pair of rollers 141 and 142.

The pair of rollers 141 and 142 may comprise an upper roller 141 supporting an upper portion of the electrode sheet 10 and a lower roller 142 supporting a lower portion of the electrode sheet 10 to support the upper and lower portions of the electrode sheet 10 so that the electrode sheet 10 is prevented from moving. Here, the upper roller 141 and the lower roller 142 may be rotatably supported on the support frame 143.

Also, for example, the uppermost portion of the lower roller 142 may be disposed on the same plane as the top surface of the lower mold 120. Furthermore, the lowermost portion of the upper roller 141 may be disposed higher upward than the top surface of the lower mold 120.

The support frame 143 may be fixed to a bottom surface of the lower roller accommodation groove 121 of the lower mold 120, and the upper roller 141 and the lower roller 142 may be rotatably coupled to the support frame 143.

Also, the support frame 143 may extend vertically. The upper roller 141 may be coupled to an upper portion of the support frame 143, and the lower roller 142 may be coupled to the support frame 143 so as to be disposed below the upper roller.

The upper roller accommodation groove 111 and the lower roller accommodation groove 121 are respectively provided in plurality in the upper mold 110 and the lower mold 120. Here, the movement prevention roller part 140 may be provided in plurality. The plurality of movement prevention roller parts 140 may be fixed to the lower roller accommodation grooves 121 of the lower mold 120, respectively. Thus, a plurality of places of the electrode sheet 10 in the traveling direction may be supported by the plurality of movement prevention roller parts 140 to maintain tension.

Also, for example, one or more movement prevention roller parts 140 may be disposed at each of front and rear sides of the notching groove 122 of the lower mold 120 in the traveling direction of the electrode sheet 10. Thus, when the electrode sheet 10 is notched by the notching protrusion 112 and the notching groove 122, the tension of the electrode sheet 10 may be maintained to prevent notching errors from occurring.

When the traveling direction G of the electrode sheet 10 is referred to as an X-axis direction, and the vertical movement direction of the upper mold 110 is referred to a Z-axis direction, rotation axes 141a and 142a of the upper roller 141 and the lower roller 142 may be disposed parallel to a Y-axis direction.

Each of the upper roller 141 and the lower roller 142 may have a cylindrical shape and extend in the direction of the rotation axes 141a and 142a. That is, the upper roller 141 and the lower roller 142 may extend in the Y-axis direction.

Here, for example, referring to FIGS. 2 to 4, an extension width c of each of the upper roller 141 and the lower roller 142 may be equal to or greater than a width a of the electrode sheet 10.

Also, for another example, the extension width c of each of the upper roller 141 and the lower roller 142 may be equal to or greater than a coating width b of the electrode active material 12 in the electrode sheet 10.

Referring to FIGS. 1 and 2, in the electrode notching device 100 for the secondary battery according to an embodiment of the present invention, which is configured as described above, when the electrode sheet 10 is notched through the pair of notching molds 130 to provide the electrode tab 14, the movement prevention roller part 140 that prevents the electrode sheet 10 from moving may be provided to minimize the occurrence of the notching errors. Particularly, a position of the notching portion N of the electrode sheet 10, which is notched when the electrode sheet is notched may be constantly maintained. Thus, the portion of the electrode sheet 10, which moves and is notched whenever the electrode sheet 10 is notched, may be changed to prevent a stepped portion, at which the electrode has different widths in the Y-axis direction, from occurring.

Here, the movement prevention roller parts 140 may be provided in plurality in the traveling direction of the electrode sheet 10 to maintain the tension of the electrode sheet 10 when the electrode sheet 10 is notched, thereby significantly reducing the occurrence of the notching errors. Thus, when a separator and positive and negative electrodes of an electrode 10' may be stacked to manufacture the electrode assembly, an overhang between the positive electrode and the negative electrode may be minimized or prevented.

Furthermore, the electrode notching device 100 for the secondary battery according to an embodiment of the present invention, which is configured as described above, may prevent the electrode sheet 10 from moving through the movement prevention roller part 140 and maintain the tension to increase in notching speed, thereby reducing a manufacturing time.

Hereinafter, an electrode notching device for a secondary battery according to another embodiment of the present invention will be described.

Figure 6:
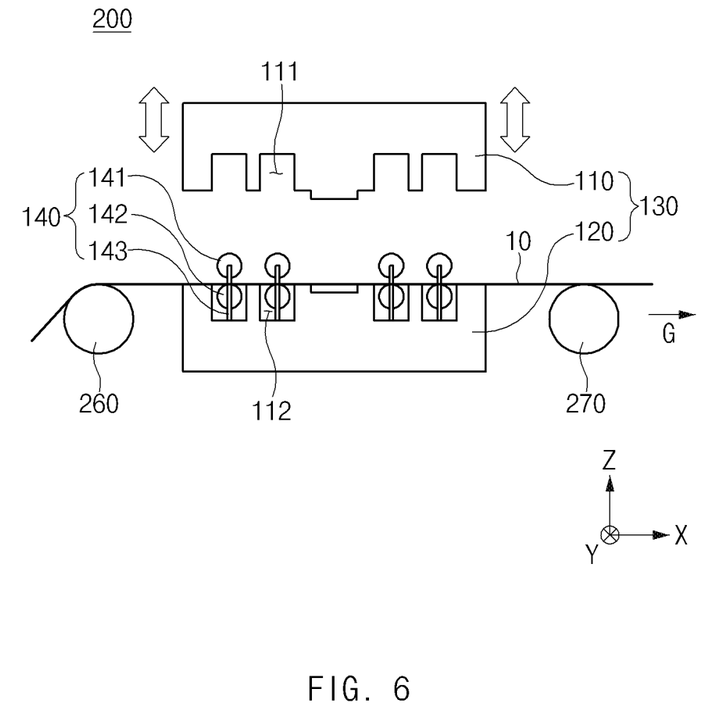
FIG. 6 is a front view of an electrode notching device for a secondary battery according to another embodiment of the present invention.

FIG. 6 is a front view of an electrode notching device for a secondary battery according to another embodiment of the present invention.

Referring to FIG. 6, an electrode notching device 200 for a secondary battery according to another embodiment of the present invention comprises a pair of notching molds 130 that press and notch both surface of an electrode sheet 10, a movement prevention roller part 140 preventing the electrode sheet 10 from moving when the electrode sheet 10 is notched, and traveling rollers 260 and 270 guiding a traveling of the electrode sheet.

When the electrode notching device 200 according to another embodiment of the present invention is different from the electrode notching device for the secondary battery according to the foregoing embodiment in that the electrode notching device 200 further comprises the traveling rollers 260 and 270. Thus, contents of this embodiment, which are duplicated with those according to the forgoing embodiment, will be omitted or briefly described, and also, differences therebetween will be mainly described.

In more detail, in the electrode notching device 200 for the secondary battery according to another embodiment of the present invention, the pair of notching molds 130 may press and notch both or opposite the surfaces of the electrode sheet 10.

Also, the pair of notching molds 130 may comprise an upper mold 110 and a lower mold 120, which are provided to face each other.

An upper roller accommodation groove 111 may be defined in the upper mold 110, and a lower roller accommodation groove 121 may be defined in the lower mold 120 to accommodate the movement prevention roller part 140.

The movement prevention roller part 140 may be provided on pressing surfaces of the pair of notching molds 130 to prevent the electrode sheet 10 from moving when the electrode sheet 10 is notched.

Also, the movement prevention roller part 140 may comprise a pair of rollers 141 and 142. The electrode sheet 10 may pass between the pair of rollers 141 and 142 and be supported by the pair of rollers 141 and 142. Here, the movement prevention roller part 140 may further comprise a support frame 143 supporting the pair of rollers 141 and 142.

The traveling rollers 260 and 270 may be respectively disposed at front and rear sides of the pair of notching molds 130 in the traveling direction G of the electrode sheet 10 to guide the traveling of the electrode sheet 10 or rotate so as to allow the electrode sheet 10 to travel in the traveling direction G.

Also, for example, the traveling rollers 260 and 270 may temporarily stop the traveling of the electrode sheet 10 when the electrode sheet 10 is notched and then allow the electrode sheet 10 to travel again after the notching is completed.

For another example, the travel rollers 260 and 270 may continuously maintain the traveling of the electrode sheet even when the electrode sheet 10 is notched.

While the present invention has been particularly shown and described with reference to exemplary embodiments thereof, it is to be understood that the scope of the present invention is not limited to the electrode notching device for the secondary battery according to the present invention, the electrode for the secondary battery, which is manufactured therethrough, and the secondary battery. It will be understood by those of ordinary skill in the art that various changes in form and details may be made therein without departing from the spirit and scope of the present invention.

Furthermore, the scope of protection of the present invention will be clarified by the appended claims.

The invention claimed is:

1. An electrode notching device for a secondary battery, which notches a non-coating portion of an electrode sheet to provide an electrode tab, the electrode notching device comprising:
   a pair of notching molds configured to press and to notch the electrode sheet; and
   a movement prevention roller part provided on pressing surfaces of the pair of notching molds to prevent the electrode sheet from moving when the electrode sheet is notched;
   wherein the pair of notching molds comprises an upper mold and a lower mold, which are provided to face each other, and
   wherein an upper roller accommodation groove is defined in the upper mold, and a lower roller accommodation groove is defined in the lower mold so that the movement prevention roller part is accommodated therein.

2. The electrode notching device of claim 1, wherein the movement prevention roller part comprises a pair of rollers, and
   wherein the electrode sheet passes between the pair of rollers and is supported by the pair of rollers.

3. The electrode notching device of claim 2, wherein the upper mold and the lower mold move in a vertical direction perpendicular to a traveling direction of the electrode sheet to notch the electrode sheet, and
   wherein the pair of rollers comprises an upper roller configured to support an upper portion of the electrode sheet and a lower roller configured to support a lower portion of the electrode sheet to support the upper and lower portions of the electrode sheet, thereby preventing the electrode sheet from moving when the electrode sheet is notched.

4. The electrode notching device of claim 3, wherein the movement prevention roller part further comprises a support frame configured to support the upper roller and the lower roller.

5. The electrode notching device of claim 4, wherein the electrode sheet travels along a top surface of the lower mold, wherein the movement prevention roller part is mounted in the lower roller accommodation groove of the lower mold, and
   wherein the upper mold moves in the vertical direction to press the electrode sheet, thereby providing the electrode tab.

6. The electrode notching device of claim 5, wherein the support frame is fixed to a bottom surface of the lower roller accommodation groove of the lower mold, and
   wherein the upper roller and the lower roller are rotatably coupled to the support frame.

7. The electrode notching device of claim 6, wherein the upper roller accommodation groove of the upper roller and the lower roller accommodation groove of the lower roller are defined to correspond to each other in directions facing each other, and
   wherein the lower roller is accommodated in the lower roller accommodation groove of the lower mold, and the upper roller is accommodated in the upper roller accommodation groove of the upper mold when the upper mold moves toward the lower mold.

8. The electrode notching device of claim 6, wherein, when the traveling direction of the electrode sheet is referred to as an X-axis direction, and the vertical movement direction of the upper mold is referred to as a Z-axis direction, rotation axes of the upper roller and the lower roller are disposed parallel to a Y-axis direction.

9. The electrode notching device of claim 8, wherein each of the upper roller and the lower roller has a cylindrical shape and extends in a rotation axis direction.

10. The electrode notching device of claim 9, wherein each of the upper roller accommodation groove of the upper mold and the lower roller accommodation groove of the lower mold is provided in plurality, and
    wherein the movement prevention roller part is provided in plurality, and the plurality of movement prevention roller parts are respectively fixed in the plurality of lower roller accommodation grooves of the lower mold.

11. The electrode notching device of claim 9, wherein an extension width of each of the upper roller and the lower roller is equal to or greater than a width of the electrode sheet.

12. The electrode notching device of claim 3, wherein an uppermost portion of the lower roller is disposed on the same plane as a top surface of the lower mold.

13. The electrode notching device of claim 1, wherein a notching protrusion protruding towards the lower mold is disposed on the upper mold,
    wherein a notching groove corresponding to the notching protrusion is defined in the lower mold,
    wherein the electrode sheet is notched by the notching protrusion and the notching groove to provide the electrode tab, and
    wherein the movement prevention roller part is disposed at each of front and rear sides of the notching groove in a traveling direction of the electrode sheet.

14. The electrode notching device of claim 1, further comprising a traveling roller disposed at each of front and rear sides of the pair of notching molds in a traveling direction of the electrode sheet to guide traveling of the electrode sheet.

15. The electrode notching device of claim 1, wherein the pair of notching molds press and notch both surfaces of the electrode sheet.

* * * * *